(12) United States Patent
Boehm et al.

(10) Patent No.: US 10,895,384 B2
(45) Date of Patent: Jan. 19, 2021

(54) PREMIXED FUEL NOZZLE

(71) Applicant: General Electric Company, Schenectady, NY (US)

(72) Inventors: Randall Charles Boehm, Loveland, OH (US); Gregory Allen Boardman, Liberty Township, OH (US); Ajoy Patra, Bangalore (IN); David Albin Lind, Lebanon, OH (US); Pradeep Naik, Bangalore (IN); Ranjeet Kumar Mishra, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 84 days.

(21) Appl. No.: 16/203,997

(22) Filed: Nov. 29, 2018

(65) Prior Publication Data

US 2020/0173662 A1 Jun. 4, 2020

(51) Int. Cl.
*F23R 3/28* (2006.01)
*F23R 3/14* (2006.01)
*F23R 3/34* (2006.01)

(52) U.S. Cl.
CPC ............... *F23R 3/283* (2013.01); *F23R 3/14* (2013.01); *F23R 3/286* (2013.01); *F23R 3/34* (2013.01)

(58) Field of Classification Search
CPC .... F23R 3/14; F23R 3/28; F23R 3/283; F23R 3/286; F23R 3/34; F23R 3/346; F23R 3/36

See application file for complete search history.

(56) References Cited

U.S. PATENT DOCUMENTS

| | | | |
|---|---|---|---|
| 4,198,815 A * | 4/1980 | Bobo | F23R 3/14 239/403 |
| 4,653,278 A | 3/1987 | Vinson et al. | |
| 5,402,633 A | 4/1995 | Hu | |
| 5,590,529 A | 1/1997 | Joshi et al. | |
| 5,607,109 A | 3/1997 | Von Berg | |
| 5,647,538 A | 7/1997 | Richardson | |
| 5,675,971 A * | 10/1997 | Angel | F23R 3/286 239/405 |
| 5,680,766 A * | 10/1997 | Joshi | F23C 7/004 239/405 |
| 5,778,676 A * | 7/1998 | Joshi | F23D 11/101 239/405 |
| 6,038,861 A | 3/2000 | Amos et al. | |
| 6,301,899 B1 | 10/2001 | Dean et al. | |

(Continued)

OTHER PUBLICATIONS

Great Britain Office Action and Search Report Corresponding to Application No. 1915886 dated May 4, 2020.

*Primary Examiner* — William H Rodriguez
(74) *Attorney, Agent, or Firm* — Dority & Manning, P.A.

(57) ABSTRACT

A fuel injector assembly for a gas turbine engine is generally provided. The first fuel injector includes a first centerbody surrounding a first walled fuel injection circuit. A first fuel injection port is extended at least partially radially through the first centerbody in fluid communication with the first walled fuel injection circuit. The first centerbody defines a cooling circuit surrounding the first walled fuel injection circuit. The first centerbody defines a plurality of cooling openings at a downstream end of the first centerbody. The plurality of cooling openings is in fluid communication with the cooling circuit. The first centerbody defines an axially extended cooling outlet at the downstream end of the first centerbody.

17 Claims, 5 Drawing Sheets

(56) References Cited

U.S. PATENT DOCUMENTS

| | | |
|---|---|---|
| 6,415,594 B1 | 7/2002 | Durbin et al. |
| 6,513,329 B1 | 2/2003 | Snyder et al. |
| 7,360,363 B2 | 4/2008 | Mandai et al. |
| 8,312,722 B2 | 11/2012 | York et al. |
| 9,383,107 B2 | 7/2016 | Shershnyov et al. |
| 9,534,788 B2 | 1/2017 | Li et al. |
| 2004/0035386 A1 | 2/2004 | Sanders |
| 2006/0021350 A1* | 2/2006 | Sanders ................ F23R 3/286 60/743 |
| 2014/0332602 A1 | 11/2014 | Cramb et al. |
| 2016/0186663 A1 | 6/2016 | Stewart et al. |
| 2017/0102147 A1 | 4/2017 | Wang et al. |
| 2017/0191667 A1 | 7/2017 | Spivey et al. |
| 2020/0041128 A1* | 2/2020 | Benjamin ............ F23D 11/386 |

\* cited by examiner

PREMIXED FUEL NOZZLE

FIELD

The present subject matter relates generally to gas turbine engine fuel injector and combustor assemblies.

BACKGROUND

Gas turbine engines are generally challenged to reduce emissions such as oxides of nitrogen ($NO_x$) formed due to the presence of nitrogen and oxygen at elevated temperatures during combustion. In high temperature combustion, such as above approximately 1530 C, $NO_x$ is produced in more significant quantities that present challenges for gas turbine engine design and operation. Above approximately 1530 C, the rate of $NO_x$ formation rapidly increases with further rises in combustion temperature.

Known structures and methods of $NO_x$ reduction in fuel injection and combustion systems are generally limited by other design criteria, including maintaining combustion stability (e.g., mitigating lean blow out) across the operating range of the engine, mitigating undesired combustion dynamics (e.g., pressure oscillations resulting from heat release during combustion), the resulting pattern factor (e.g., circumferential variations in combustion temperature), as well as other emissions, such as smoke, unburned hydrocarbons, carbon monoxide, and carbon dioxide.

Furthermore, fuel injector and combustor assemblies are generally challenged to mitigate wear and deterioration of fuel injector and combustor structures due to the high temperatures and high temperature gradients generally resulting from increasingly efficient gas turbine engines.

As such, there is a need for a fuel injector and combustor assembly that provides improved $NO_x$ emissions while maintaining combustion stability, mitigating combustion dynamics, maintaining desirable pattern factor and emissions, and mitigates wear and deterioration of fuel injector structures resulting from high temperature combustion.

Pressure oscillations generally occur in combustion sections of gas turbine engines resulting from the ignition of a fuel and air mixture within a combustion chamber. While nominal pressure oscillations are a byproduct of combustion, increased magnitudes of pressure oscillations may result from generally operating a combustion section at lean conditions, such as to reduce combustion emissions. Increased pressure oscillations may damage combustion sections and/or accelerate structural degradation of the combustion section in gas turbine engines, thereby resulting in engine failure or increased engine maintenance costs. As gas turbine engines are increasingly challenged to reduce emissions, structures for attenuating combustion gas pressure oscillations are needed to enable reductions in gas turbine engine emissions while maintaining or improving the structural life of combustion sections and providing desired fuel-air mixing.

BRIEF DESCRIPTION

Aspects and advantages of the invention will be set forth in part in the following description, or may be obvious from the description, or may be learned through practice of the invention.

An aspect of the present disclosure is directed to a fuel injector assembly for a gas turbine engine. The first fuel injector includes a first centerbody surrounding a first walled fuel injection circuit. A first fuel injection port is extended at least partially radially through the first centerbody in fluid communication with the first walled fuel injection circuit. The first centerbody defines a cooling circuit surrounding the first walled fuel injection circuit. The first centerbody defines a plurality of cooling openings at a downstream end of the first centerbody. The plurality of cooling openings is in fluid communication with the cooling circuit. The first centerbody defines an axially extended cooling outlet at the downstream end of the first centerbody.

In one embodiment, the cooling outlet is in direct fluid communication with a combustion chamber of the gas turbine engine. The cooling outlet is defined axially adjacent to the combustion chamber.

In another embodiment, the plurality of cooling openings is defined through the first centerbody at least partially upstream of the cooling outlet.

In yet another embodiment, the plurality of cooling openings is defined substantially axially through the first centerbody.

In still another embodiment, the first centerbody comprises a conical or frusto-conical structure.

In still yet another embodiment, the first centerbody comprises a bulbous structure.

In one embodiment, the first centerbody defines a throat area between the cooling circuit and the axially extended cooling outlet. The cooling outlet defines an increasing cross sectional area from the throat area to the downstream end of the first centerbody.

In various embodiments, the first fuel injector further comprises an internal shroud disposed within the first centerbody. The internal shroud surrounds the first walled fuel injection circuit. In one embodiment, the internal shroud defines a conical or frusto-conical structure defining a decreasing cross sectional area from an upstream end to a downstream end. In another embodiment, the internal shroud defines a cooling cavity between the internal shroud and the first walled fuel injection circuit.

In still various embodiments, the first fuel injector is configured to provide only a flow of air through the downstream end of the first centerbody via the cooling opening. In one embodiment, the first fuel injector is configured to provide only a flow of air through the first centerbody downstream of the first fuel injection port.

In still yet various embodiments, the fuel injector assembly further includes a second fuel injector including a second centerbody surrounding a second walled fuel injection circuit. A second fuel injection port is extended at least partially radially through the second centerbody in fluid communication with the second walled fuel injection circuit. The second centerbody defines a cooling circuit surrounding the second walled fuel injection circuit. The second walled fuel injection circuit defines an axially extended third fuel injection port at a downstream end of the second centerbody. In one embodiment, the second fuel injector is configured to provide a flow of fuel through the downstream end of the second centerbody via the third fuel injection port. In another embodiment, the second centerbody of the second fuel injector defines a second cooling outlet at the downstream end of the second centerbody surrounding the third fuel injection port.

In yet another embodiment, the fuel injector assembly further includes a swirler assembly disposed upstream of the first fuel injection port.

Another aspect of the present disclosure is directed to a gas turbine engine including a first fuel injector that includes a first centerbody surrounding a first walled fuel injection circuit. A first fuel injection port is extended at least partially radially through the first centerbody in fluid communication with the first walled fuel injection circuit, and further wherein the first centerbody defines a cooling circuit surrounding the first walled fuel injection circuit. The first centerbody defines a plurality of cooling openings at a downstream end of the first centerbody. The plurality of cooling openings is in fluid communication with the cooling circuit. The first centerbody defines an axially extended cooling outlet at the downstream end of the first centerbody.

In one embodiment of the engine, the first fuel injector further includes an internal shroud disposed within the first centerbody, wherein the internal shroud surrounds the first walled fuel injection circuit.

In another embodiment, the engine further includes a second fuel injector that includes a second centerbody surrounding a second walled fuel injection circuit. A second fuel injection port is extended at least partially radially through the second centerbody in fluid communication with the second walled fuel injection circuit. The second centerbody defines a cooling circuit surrounding the second walled fuel injection circuit. The second walled fuel injection circuit defines an axially extended third fuel injection port at a downstream end of the second centerbody. In one embodiment, the first fuel injector and the second fuel injector are arranged asymmetrically around an axial centerline axis of the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "upstream of" or "downstream of" generally refer to directions toward "upstream 99" or toward "downstream 98", respectively, as provided in the figures.

Embodiments of a gas turbine engine including embodiments of a fuel injector assembly are generally provided that may improve $NO_x$ emissions while maintaining combustion stability, mitigating combustion dynamics, maintaining desirable pattern factor and emissions, and mitigating wear and deterioration of fuel injector structures resulting from high temperature combustion. The fuel injector assembly includes a first fuel injector including a cooled tip premixer providing lower $NO_x$ emissions and a second fuel injector defining an enhanced lean blow out (ELBO) fuel injector for improved operability, such as improved flame stability and lean blow out performance, or improved combustion dynamics, such as combustion acoustics. Embodiments of the fuel injector assembly shown and described herein provides the benefit of improving combustor operability (e.g., flame stability, lean blow out performance, combustion dynamics, etc.) via the generally richer fuel/air mixture from the ELBO second fuel injector while improving emissions performance via the cooled tip premixer first fuel injector.

Figure 1:
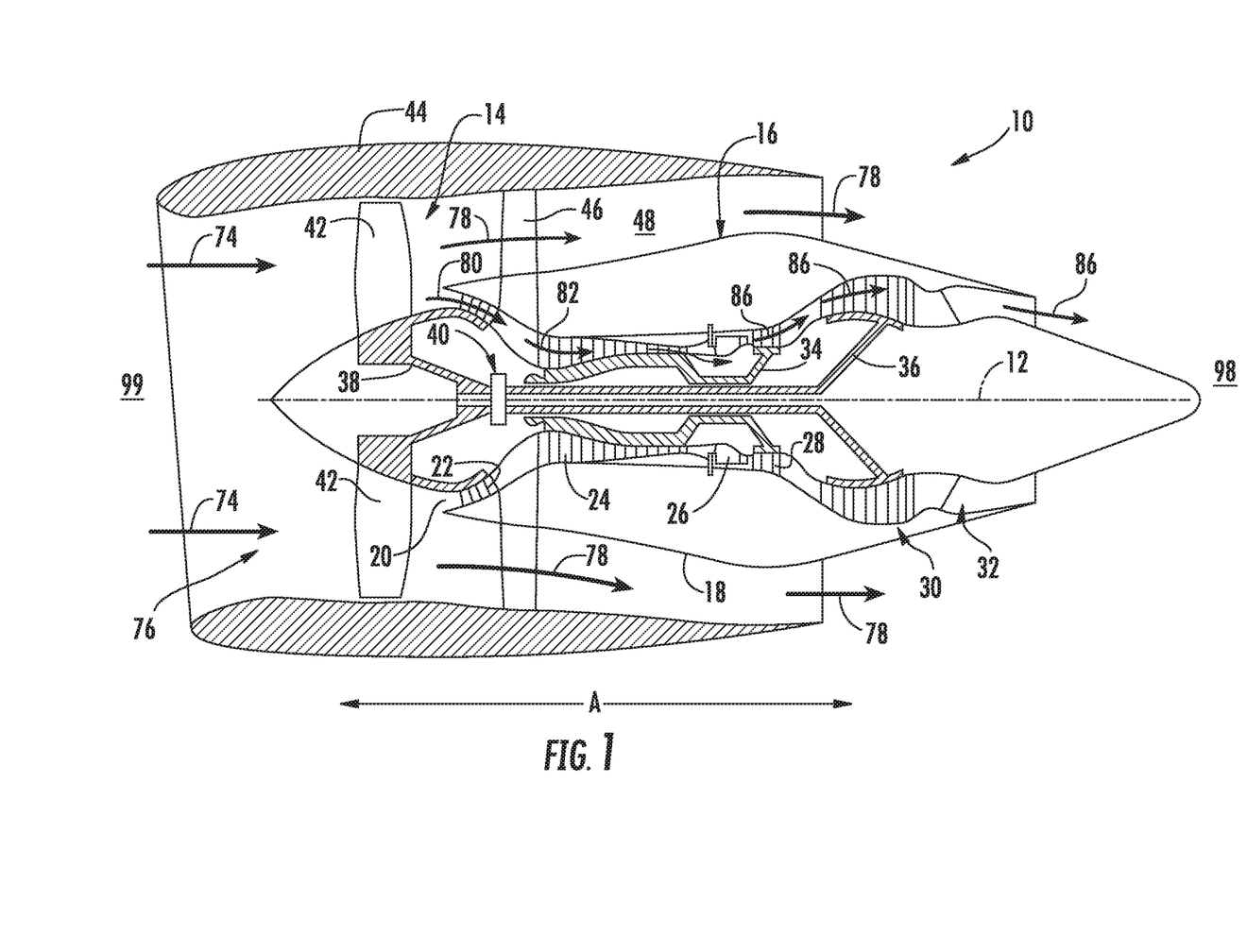
FIG. 1 is a schematic cross-sectional view of an exemplary embodiment of a gas turbine engine.

Referring now to the drawings, FIG. 1 is a schematic partially cross-sectioned side view of an exemplary high by-pass turbofan engine 10 herein referred to as "engine 10" as may incorporate various embodiments of the present disclosure. Although further described below with reference to a turbofan engine, the present disclosure is also applicable to propulsion systems and turbomachinery in general, including turbojet, turboprop, and turboshaft gas turbine engines and marine and industrial turbine engines and auxiliary power units. As shown in FIG. 1, the engine 10 has a longitudinal or axial centerline axis 12 that extends therethrough for reference purposes and generally along an axial direction A. The engine 10 further defines an upstream end 99 and a downstream 98 generally opposite of the upstream end 99 along the axial direction A. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
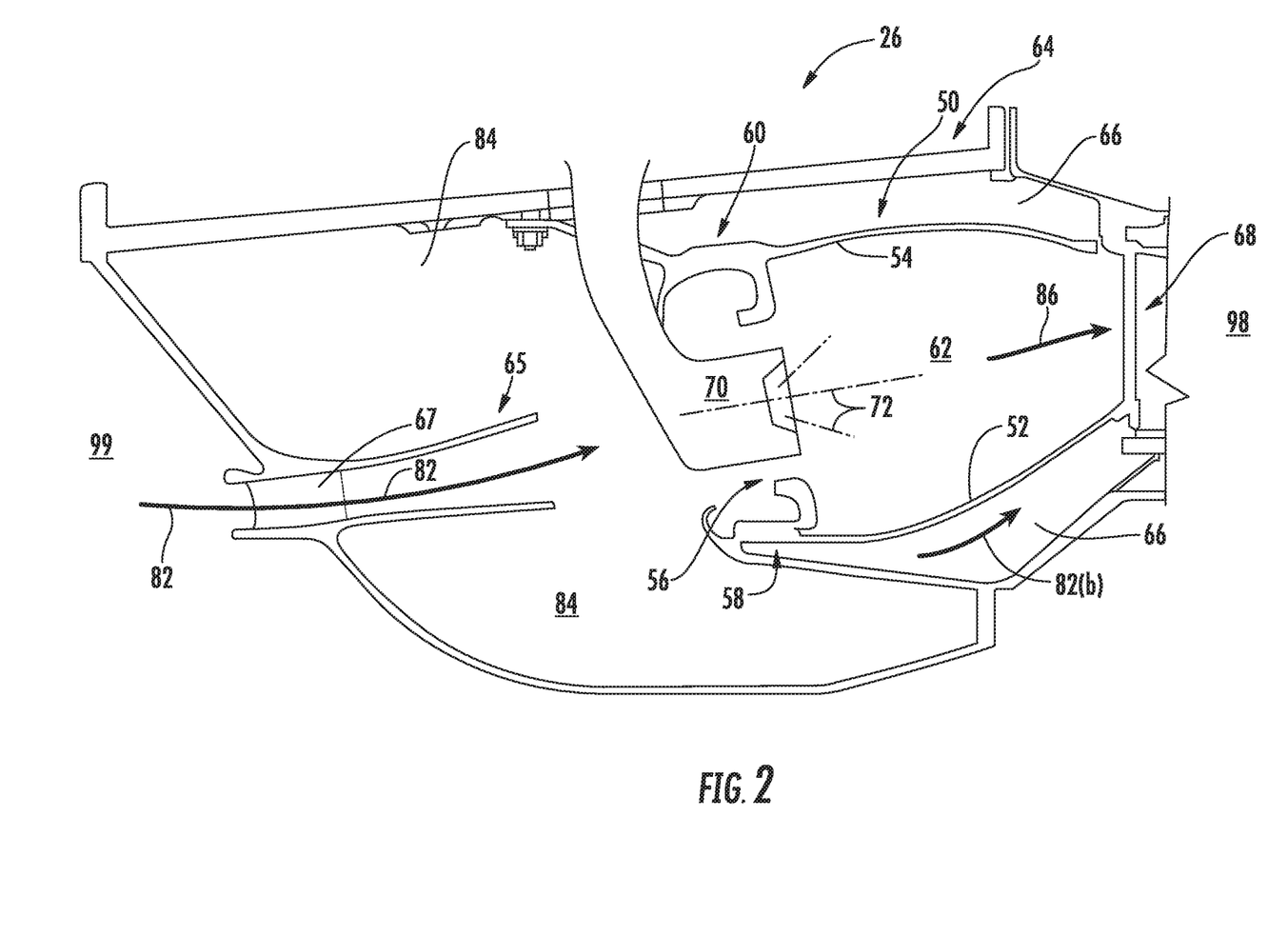
FIG. 2 is a cross sectional side view of an exemplary embodiment of a combustor assembly of the gas turbine engine generally provided in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a dome wall 56 that extends radially between upstream ends 58, 60 of the inner liner 52 and the outer liner 54 respectfully. In other embodiments of the combustion section 26, the combustion assembly 50 may be a multi-annular combustor, such as a can or can-annular type. As shown in FIG. 2, the inner liner 52 is radially spaced from the outer liner 54 with respect to axial centerline 12 (FIG. 1) and defines a generally annular combustion chamber 62 therebetween. However, it should be appreciated that the liners 52, 54, swirlers (not shown), or other components may be disposed from the axial centerline 12 such as to define a multi-annular combustor configuration.

As shown in FIG. 2, the inner liner 52 and the outer liner 54 may be encased within an outer casing 64. An outer flow passage 66 may be defined around the inner liner 52, the outer liner 54, or both. The inner liner 52 and the outer liner 54 may extend from the dome wall 56 towards a turbine nozzle or inlet 68 to the HP turbine 28 (FIG. 1), thus at least partially defining a hot gas path between the combustor assembly 50 and the HP turbine 28. A fuel injector assembly 70 may extend at least partially through the dome wall 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel injector assembly 70. The compressed air 82 pressurizes the diffuser cavity 84. The compressed air 82 enters the fuel injector assembly 70 to mix with a fuel. The fuel injector assembly 70 premixes fuel and air 82 at each of a first fuel injector 100 and second fuel injector 200. After premixing the fuel and air at the fuel injector assembly 70, the fuel-air mixture 72 burns from each of the first fuel injector 100 and the second fuel injector 200 as an array of flames.

Referring still to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

As the fuel-air mixture burns, pressure oscillations occur within the combustion chamber 62. These pressure oscillations may be driven, at least in part, by a coupling between the flame's unsteady heat release dynamics, the overall acoustics of the combustor 50 and transient fluid dynamics within the combustor 50. The pressure oscillations generally result in undesirable high-amplitude, self-sustaining pressure oscillations within the combustor 50. These pressure oscillations may result in intense single-frequency or multiple-frequency dominated acoustic waves that may propagate within the generally closed combustion section 26.

Depending, at least in part, on the operating mode of the combustor 50, these pressure oscillations may generate acoustic waves at a multitude of low or high frequencies. These acoustic waves may propagate downstream from the combustion chamber 62 towards the high pressure turbine 28 and/or upstream from the combustion chamber 62 back towards the diffuser cavity 84 and/or the outlet of the HP compressor 24. In particular, as previously provided, low frequency acoustic waves, such as those that occur during engine startup and/or during a low power to idle operating condition, and/or higher frequency waves, which may occur at other operating conditions, may reduce operability margin of the turbofan engine and/or may increase external combustion noise or vibration.

Figure 3:
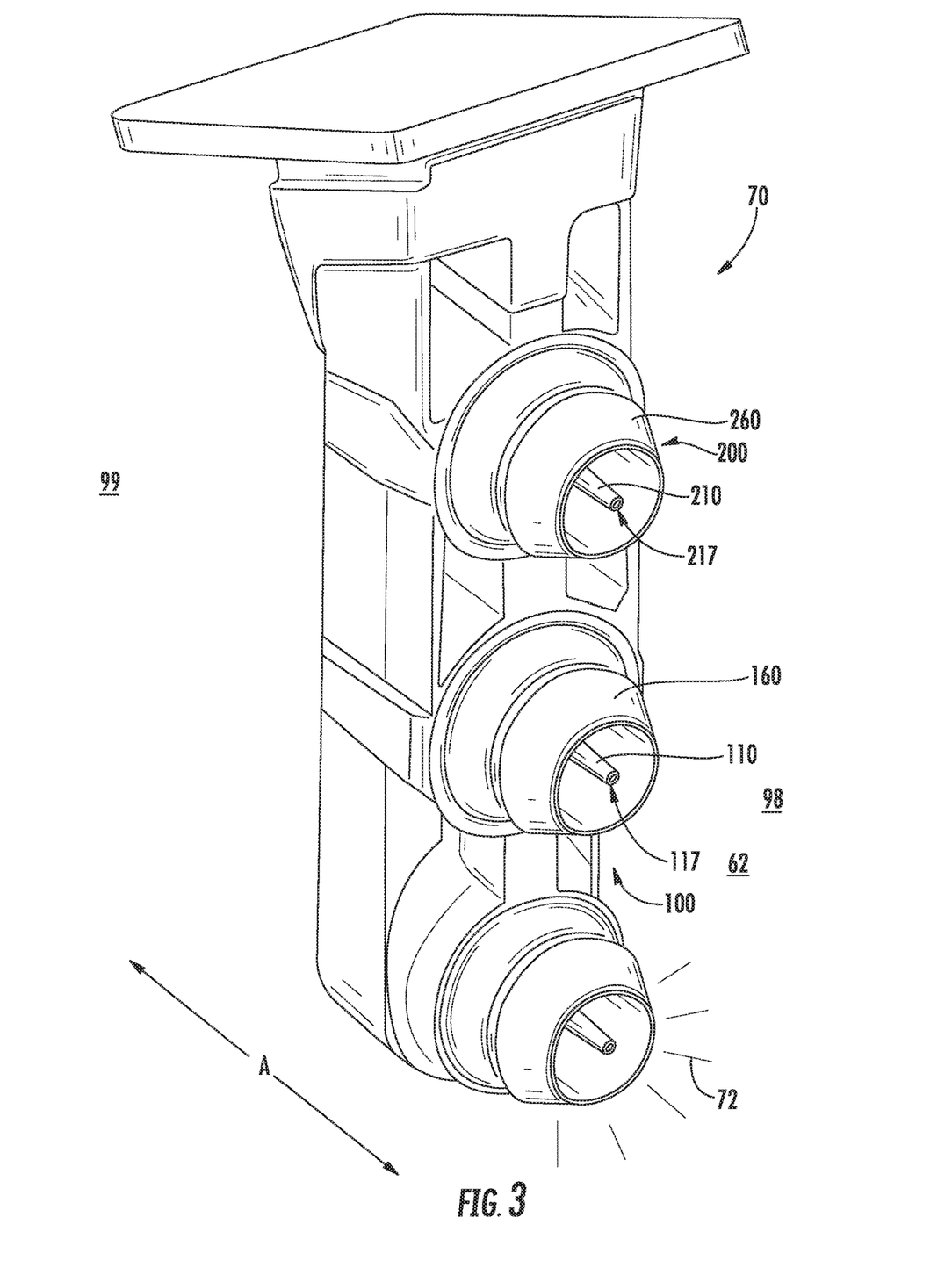
FIG. 3 is a perspective view of an exemplary embodiment of a fuel injector assembly of the combustor assembly generally provided in FIG. 2.

Referring now to the perspective view of the exemplary embodiment of the fuel injector assembly 70 generally provided in FIG. 3, the fuel injector assembly 70 includes a first fuel injector 100 and a second fuel injector 200. Referring further to the exemplary cross sectional side view of the fuel injector assembly 70 depicted in FIG. 4, the first fuel injector 100 includes a first centerbody 110 surrounding a first walled fuel injection circuit 120. A first fuel injection port 130 is extended at least partially radially through the first centerbody 110 in fluid communication with the first walled fuel injection circuit 120, through which a flow of liquid and/or gaseous fuel 71 is provided. The first centerbody 110 defines a cooling circuit 140 surrounding the first walled fuel injection circuit 120. The first centerbody 110 defines a plurality of cooling openings 115 at the downstream end 98 of the first centerbody 110. The plurality of cooling openings 115 is in fluid communication with the cooling circuit 140. The first centerbody 110 defines an axially extended cooling outlet 117 at the downstream end 98 of the first centerbody 110. A flow of air 85 is provided into the cooling circuit 140. At least a portion of the flow of air, shown via arrows 87, egresses through the plurality of cooling openings 115, such as further described below. Another portion of the flow of air, shown via arrows 89, egresses through the cooling outlet 117, such as further described below.

In various embodiments, the first fuel injection port 130 is extended radially and axially through the first centerbody 110. In one embodiment, the first fuel injection port 130 is in direct fluid communication with the first walled fuel injection circuit 120. For example, a fuel circuit 125 defined within the first walled fuel injection circuit 120 egresses a liquid or gaseous fuel from within the first walled fuel injection circuit 120 through the first fuel injection port 130 directly into a fuel-air mixing passage 150 defined between the first centerbody 110 and a surrounding outer shroud 160 of the first fuel injector 100. As generally depicted in regard to FIG. 4, the first centerbody 110 is disposed substantially or entirely within the outer shroud 160.

Figure 4:
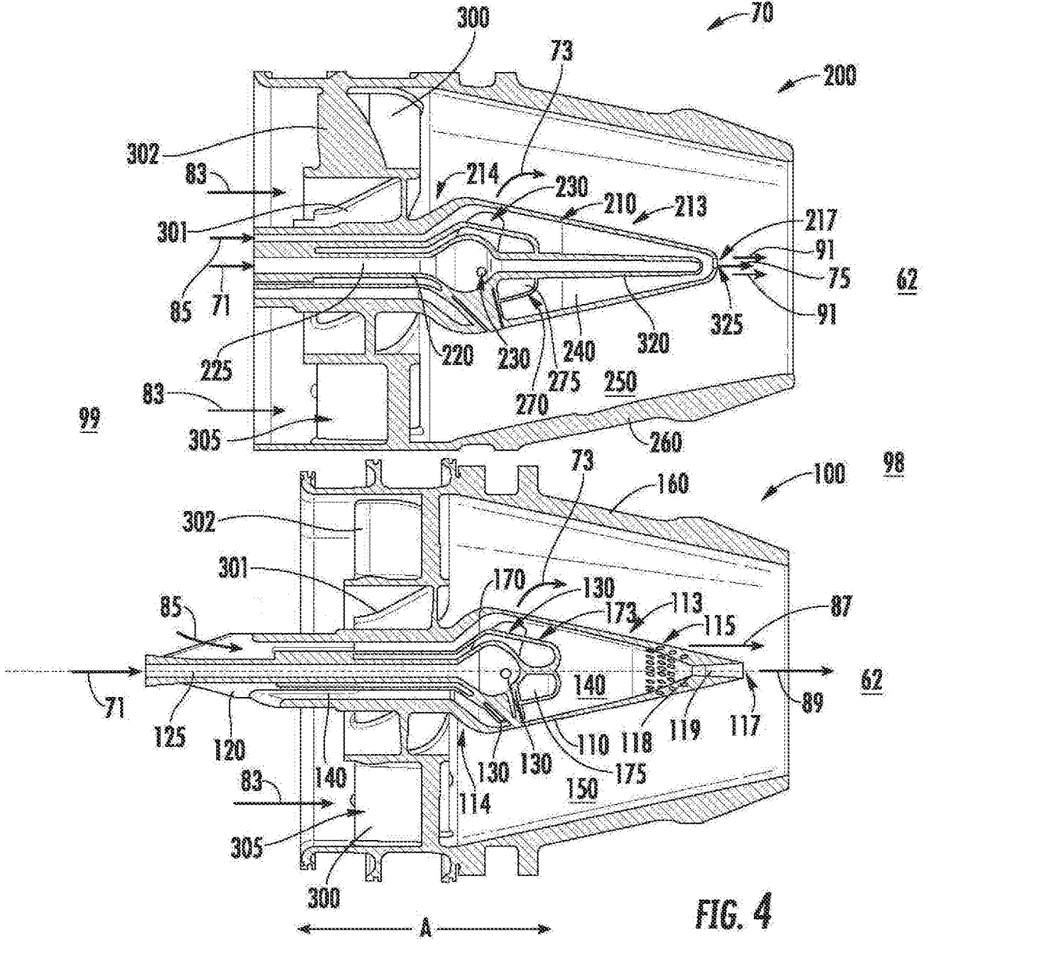
FIG. 4 is a cross sectional side view of an exemplary embodiment of the fuel injector assembly generally provided in FIG. 3.

In other embodiments, first centerbody 110 defines the plurality of cooling openings 115 at the downstream end 98 of the first centerbody 110 downstream of the first fuel injection port 130. In one embodiment, the plurality of cooling openings 115 is in direct fluid communication with the cooling circuit 140 such as to egress a flow of air directly from the cooling circuit 140 into the fuel-air mixing passage 150 through the first centerbody 110 via the cooling openings 115.

In the embodiment generally provided in regard to FIG. 4, the first centerbody 110 at least partially defines a conical or frusto-conical structure 113. For example, the conical or frusto-conical structure 113 of the first centerbody 110 is defined as decreasing in cross-sectional area as the first centerbody 110 is extended toward the downstream end 98 to the combustion chamber 62. The cooling openings 115 may be defined substantially axially through the first centerbody 110 at the downstream end 98 of the conical or frusto-conical structure 113 of the first centerbody 110. In still various embodiments, the cooling openings 115 may be defined substantially axially and tangentially through the first centerbody 110 at the downstream end 98 of the conical or frusto-conical structure 113 of the first centerbody 110. The conical or frusto-conical structure 113, such as to define a smaller cross-sectional area at the downstream end 98 of the first centerbody 110, may mitigate re-circulation at the downstream end 98 of the first centerbody 110. In various embodiments, the first centerbody 110 may define a cylindrical structure upstream (i.e., toward the upstream end 99) of the conical or frusto-conical structure 113 of the first centerbody 110.

In still various embodiments, such as generally provided in regard to FIG. 4, the first centerbody 110 may at least partially define a bulbous structure 114. For example, the bulbous structure 114 may include the conical or frusto-conical structure 113 and further define a radially extended portion upstream of the conical or frusto-conical structure 113. As another example, the bulbous structure 114 of the first centerbody 110 defines an increasing cross-sectional area as the first centerbody 110 is extended from the upstream end 99 toward the downstream end 98. The bulbous structure 114 further includes the conical or frusto-conical structure 113 defining a decreasing cross-sectional area as the first centerbody 110 is extended toward the downstream end 98 to the combustion chamber 62 from the bulbous structure 114 portion. Additionally, in various embodiments, the bulbous structure 114 is defined downstream of a swirler assembly 300 (further described below). The combination of the bulbous structure 114 and the conical or frusto-conical structure 113 may generally provide a geometry corresponding to the flow field emanating from the swirler assembly 300, such as further described below.

In other embodiments, the cooling openings 115 may be defined at least partially radially through the first centerbody 110. In another embodiment, the plurality of cooling openings 115 is defined through the first centerbody 110 at least partially upstream of the cooling outlet 117. In various embodiments, the plurality of cooling openings 115 is generally defined through the first centerbody 110 at the downstream end 98 (i.e., proximate to the combustion chamber 62 and hot gases therein) to provide a film of cooling air therethrough to cool the downstream end tip of the first centerbody 110. As such, the cooling openings 115 at the downstream end 98 of the first centerbody 110 may mitigate flameholding or other thermal distresses at the first centerbody 110.

In still various embodiments, the first fuel injector 100 is configured to provide only a flow of air through the downstream end 98 of the first centerbody 110 via the plurality of cooling openings 115 and the cooling outlet 117. For example, the first fuel injector 100 may be configured to provide only a flow of air, rather than fuel or a fuel-air mixture, through the first centerbody 110 downstream of the first fuel injection port 130. As another example, the first fuel injector 100 is configured to provide only a flow of air, rather than fuel or a fuel-air mixture, through the plurality of cooling openings 115 and the cooling outlet 117 defined through the first centerbody 110 downstream of the first fuel injection port 130.

In one embodiment, the cooling outlet 117 is in direct fluid communication with the combustion chamber 62. For example, such as depicted in regard to FIG. 4, the cooling outlet 117 is extended along the axial direction A from the cooling circuit 140 to the combustion chamber 62, such as to define a cooling passage 119 between the cooling outlet 117 and the cooling circuit 140. In another embodiment, the first centerbody 110 defines a throat area 118 between the cooling circuit 140 and the axially extended cooling outlet 117, such as between the cooling circuit 140 and the cooling passage 119. In one embodiment, the cooling passage 119 defines a generally increasing cross sectional area from the throat area 118 to the downstream end 98 of the first centerbody 110, such as at the cooling outlet 117 axially adjacent to the combustion chamber 62.

Referring still to FIG. 4, the first fuel injector 100 further includes an internal shroud 170 disposed within the first centerbody 110. The internal shroud 170 at least partially surrounds the first walled fuel injection circuit 120. For example, the internal shroud 170 is extended at least partially along the axial direction A to at least partially surround the walled fuel injection circuit 120 and the fuel circuit 125 therein. The internal shroud 170 defines a cooling cavity 175 between the internal shroud 170 and the first walled fuel injection circuit 120.

In one embodiment, the internal shroud 170 further defines a conical or frusto-conical structure 173 surrounding a portion of the fuel circuit 125. For example, the conical or frusto-conical structure 173 of the internal shroud 170 generally surrounds a portion of the walled fuel injection circuit 120 from which the walled fuel injection port 130 is extended at least partially radially therefrom and through the first centerbody 110, such as to provide direct fluid communication from the fuel circuit 125 to the fuel-air mixing passage 150. The conical or frusto-conical structure 173 of the internal shroud 170 may generally define a decreasing cross sectional area from the upstream end 99 toward the downstream end 98 of the first fuel injector 100. In various embodiments, the conical or frusto-conical structure 173 of the internal shroud 170 substantially corresponds to the conical or frusto-conical structure 113 of the first centerbody 110, such as to provide a streamlined flow inside at the cooling circuit 140. As such, the conical or frusto-conical structures 113, 173 of the first centerbody 110 and the internal shroud 170 may condition (e.g., accelerate or pressurize) the flow of air through the cooling circuit 140 that egresses at the downstream end such as to mitigate autoignition, flameholding, or ingestion of fuel from the combustion chamber 62 into the cooling circuit 140.

Referring still to FIG. 4, the fuel injector assembly 70 further includes a second fuel injector 200 including a second centerbody 210 surrounding a second walled fuel injection circuit 220. Various embodiments of the second centerbody 210 of the second fuel injector 200 are configured substantially similarly as the first centerbody 110 of the first fuel injector 100. For example, the second centerbody 210 may at least partially define a conical or frusto-conical structure 213 such as shown and described in regard to the conical or frusto-conical structure 113 of the first centerbody 110. The second fuel injector 200 may still further define a walled second fuel injection port 230 configured substantially similarly as shown and described in regard to the walled first fuel injection port 130 of the first fuel injector 100. As yet another example, the second centerbody 210 may at least partially define a bulbous structure 214 such as shown and described in regard to bulbous structure 114 of the first centerbody 110.

The second fuel injector 200 may further define a second walled fuel injection circuit 220, and a second fuel circuit 225 defined therein, configured substantially similarly as shown and described in regard to the first walled fuel injection circuit 120 of the first fuel injector 100. An internal shroud 270 surrounds the second walled fuel injection circuit 220, defining a cooling cavity 275 between the internal shroud 270 and the second walled fuel injection circuit 220, such as shown and described in regard to the internal shroud 170 and cooling cavity 175 at the first fuel injector 100.

However, in various embodiments, the second fuel injector 200 further defines at the second walled fuel injection circuit 220 an axially extended third walled fuel injection circuit 320 defining a third fuel injection port 325 at the downstream end 98 of the second centerbody 210. In various embodiments, the second fuel injector 200 may include a plurality of the third fuel injection port 325 defined at the downstream end of the second centerbody 210.

In one embodiment, the third fuel injection port 325 is defined axially adjacent to the combustion chamber 62. The third walled fuel injection circuit 320 may generally be in fluid communication with the second walled fuel injection circuit 220 such as to enable a flow of fuel from the second fuel circuit 225 to egress through the third fuel injection port 325 into the combustion chamber 62 via the third walled fuel injection circuit 320. The third walled fuel injection circuit 320 is surrounded by the second centerbody 210 and a cooling circuit 240 defined within the second centerbody 210. For example, the second fuel injector 200 may define the cooling circuit 240 between the second centerbody 210 and the second walled fuel injection circuit 220, such as shown and described in regard to the cooling circuit 140 at the first fuel injector 100. The cooling circuit 240 at the second fuel injector 200 further surrounds the third walled fuel injection circuit 320.

In still various embodiments, the second fuel injector 200 is configured to provide a flow of fuel through the downstream end 98 of the second centerbody 210 via the third fuel injection port 325. In one embodiment, the second centerbody 210 further defines a second cooling outlet 217 at the downstream end 98 tip of the second centerbody 210 surrounding the third fuel injection port 325. For example, the second cooling outlet 217 and the third fuel injection port 325 may be disposed in substantially concentric arrangement. The substantially concentric arrangement of the second cooling outlet 217 and the third fuel injection port 325 may enable a flow of air 91 through the second cooling outlet 217 surrounding the third fuel injection port 325 such as to mitigate ingestion of fuel back into the second cooling outlet 217 and into the cooling circuit 240.

The second fuel injector 200 may generally define an enhanced lean blow out (ELBO) fuel injector providing a first flow of fuel through the second fuel injection port 230 and a second flow of fuel through the third fuel injection port 325 downstream of the second fuel injection port 230. A substantially axial flow of fuel 75 through the axially extended third walled fuel injection circuit 320 and third fuel injection port 325 may provide a generally rich or richer fuel-air mixture for flame stability compared to the at least partially radial flow of fuel 73 through the second fuel injection port 230.

Referring still to FIG. 4, the second fuel injector 200 may further include a surrounding outer shroud 260 defining a fuel-air mixing passage 250 between the outer shroud 260 and the second centerbody 210, such as shown and described in regard to the outer shroud 160 of the first fuel injector 100. Referring to both the first fuel injector 100 and the second fuel injector 200, one or more swirler assemblies 300 may be defined between the respective outer shrouds 160, 260 and centerbodies 110, 210 of each fuel injector 100, 200. For example, in the embodiment generally provided in regard to FIG. 4, the swirler assembly 300 includes a first swirler 301 and a second swirler 302 surrounding the first swirler 301. Although depicted generally as axial swirlers (i.e., with vanes 305 extended along the axial direction A to admit a flow of air 83 substantially axially therethrough), it should be appreciated that the swirler assembly 300 may include any combination of axial swirler and/or radial swirler (i.e., vanes extended at least partially along the radial direction R to admit a flow of air substantially radially therethrough).

The fuel injectors 100, 200 may each define their respective centerbodies 110, 210 corresponding substantially to a flow field emanating from the flow of air 83 through the swirler assembly 300 disposed upstream of the fuel injection ports 130, 230, 325. The swirling air 83 from the swirler assembly 300 may then atomize a flow of fuel 73 egressing from the fuel injection ports 130, 230, such as to provide desired mixing and emissions performance. At the first fuel injector 100, an additional flow of air 87 egressed from the cooling openings 115 may generally provide boundary layer dilution at the first centerbody 110 such as to protect against flame holding and thermal distress at the first centerbody 110. The additional flow of air 87 through the cooling openings 115, when mixed with the flow of fuel 73 from the first fuel injection port 130 mixed with the flow of air 83 through the swirler assembly 300, provides a lean or relatively leaner fuel-air mixture at the downstream end 98 of the first fuel injector 100 in contrast to the rich or relatively richer fuel-air mixture from the third fuel injection port 325 at the second fuel injector 200. For example, in various embodiments, the first fuel injector 100 may define a fuel-air ratio at the downstream end 98 of the first centerbody 110 at least 33% less than a fuel-air ratio at the downstream end 98 of the second centerbody 210.

In various embodiments, a fuel flow split may be defined between the third fuel injection port 325 and the second fuel injection port 220 and/or first fuel injection port 120. For example, the fuel injector assembly 70 may define a passive configuration in which different diameters, volumes, cross sectional areas, or changes therein, between the fuel injection ports 120, 220, 325 define different fuel flow splits therebetween. In other embodiments, the fuel injector assembly 70, and a fuel system of the engine 10 (FIGS. 1-2), may define an active configuration in which different or independently controlled flow rates, pressures, temperatures, etc. of fuel is provided between the first fuel injector 100 and the second fuel injector 200, or between the first fuel injection port 120, the second fuel injection port, and/or the third fuel injection port 325, or combinations thereof.

Figure 5:
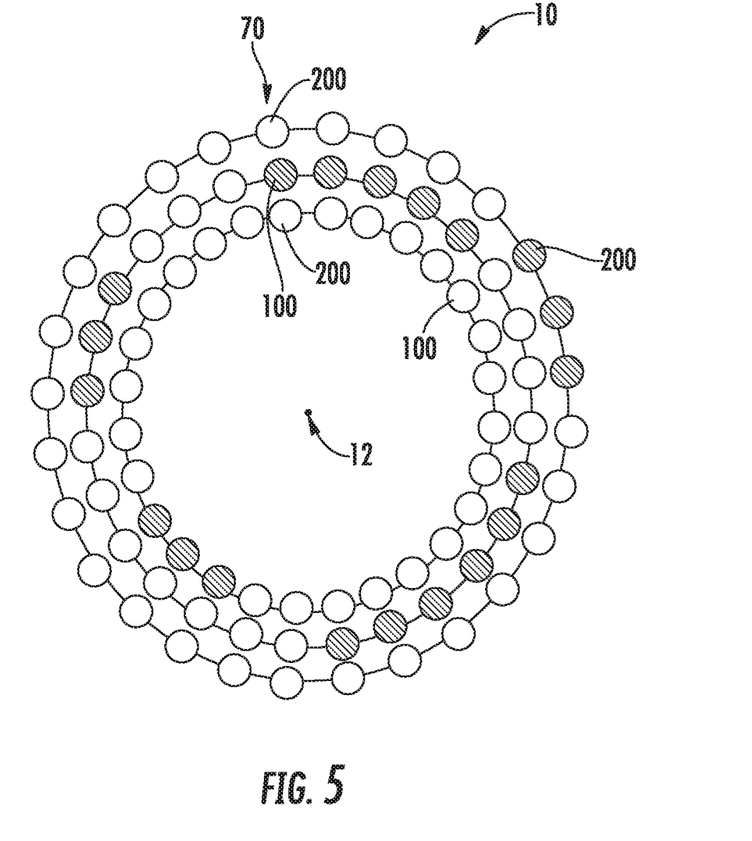
FIG. 5 is a flowpath view of an exemplary arrangement of a first fuel injector and second fuel injector of the fuel injector assemblies of the combustor assembly.

Referring briefly to FIG. 5, an exemplary embodiment of the combustor assembly 50 including a plurality of fuel injector assemblies 70 in circumferential arrangement is generally provided. The plurality of fuel injector assemblies 70 may include altered arrangements of the first fuel injector 100 and the second fuel injector 200. In one embodiment, the first fuel injector 100 and the second fuel injector 200 may be arranged in symmetric or axi-symmetric arrangement relative to the axial centerline axis 12 of the engine 10 (FIG. 1). In another embodiment, the first fuel injector 100 and the second fuel injector 200 may be arranged in asymmetric arrangement, such as based on a desired mitigation of combustion dynamics (e.g., acoustics, pressure fluctuations, etc.).

All or part of the combustor assembly 50 and fuel injector assembly 70 may each be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the fuel injector assembly 70. Furthermore, the combustor assembly 50 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

Various embodiments of ports 130, 230, 325, openings 115, outlets 117, 217, circuits 120, 125, 140, 220, 240, 320, and other passages, circuits, openings, ports, etc. may define one or more cross sectional areas, including, but not limited to, circular, elliptical, oblong, polygonal, etc. or two or more cross sectional areas transitioning between two or more of the aforementioned cross sectional areas. It should further be appreciated that the circuits, openings, ports, passages, etc. disclosed herein may include one or more surface features suitable for providing desired flow characteristics of the fuel and/or air or other oxidizer therethrough, such as, but not limited to, rifling, polishing or super polishing, protuberances, or various surface roughnesses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel injector assembly for a gas turbine engine, the fuel injector assembly comprising:
   a first fuel injector comprising a first centerbody surrounding a first walled fuel injection circuit, wherein a first fuel injection port is extended at least partially radially through the first centerbody in fluid communication with the first walled fuel injection circuit, and further wherein the first centerbody defines a cooling circuit surrounding the first walled fuel injection circuit, and wherein the first centerbody defines a plurality of cooling openings at a downstream end of the first centerbody, wherein the plurality of cooling openings is in fluid communication with the cooling circuit, and further wherein the first centerbody defines an axially extended cooling outlet at the downstream end of the first centerbody, and wherein the first centerbody defines a throat area between the cooling circuit and the axially extended cooling outlet, and further wherein the cooling outlet defines an increasing cross sectional area from the throat area to the downstream end of the first centerbody, and wherein the plurality of cooling openings is defined substantially axially through the first centerbody.

2. The fuel injector assembly of claim 1, wherein the cooling outlet is in direct fluid communication with a combustion chamber of the gas turbine engine, and further wherein the cooling outlet is defined axially adjacent to the combustion chamber.

3. The fuel injector assembly of claim 1, wherein the plurality of cooling openings is defined through the first centerbody at least partially upstream of the cooling outlet.

4. The fuel injector assembly of claim 1, wherein the first centerbody comprises a conical or frusto-conical structure.

5. The fuel injector assembly of claim 1, wherein the first centerbody comprises a bulbous structure.

6. The fuel injector assembly of claim 1, wherein the first fuel injector further comprises an internal shroud disposed within the first centerbody, wherein the internal shroud surrounds the first walled fuel injection circuit.

7. The fuel injector assembly of claim 6, wherein the internal shroud defines a conical or frusto-conical structure defining a decreasing cross sectional area from an upstream end to a downstream end.

8. The fuel injector assembly of claim 6, wherein the internal shroud defines a cooling cavity between the internal shroud and the first walled fuel injection circuit.

9. The fuel injector assembly of claim 1, wherein the first fuel injector is configured to provide only a flow of air through the downstream end of the first centerbody via the cooling outlet.

10. The fuel injector assembly of claim 9, wherein the first fuel injector is configured to provide only a flow of air through the first centerbody downstream of the first fuel injection port.

11. The fuel injector assembly of claim 1, further comprising:
    a second fuel injector comprising a second centerbody surrounding a second walled fuel injection circuit, wherein a second fuel injection port is extended at least partially radially through the second centerbody in fluid communication with the second walled fuel injection circuit, and further wherein the second centerbody defines a cooling circuit surrounding the second walled fuel injection circuit, and further wherein the second walled fuel injection circuit defines an axially extended third fuel injection port at a downstream end of the second centerbody.

12. The fuel injector assembly of claim 11, wherein the second fuel injector is configured to provide a flow of fuel through the downstream end of the second centerbody via the third fuel injection port.

13. The fuel injector assembly of claim 11, wherein the second centerbody of the second fuel injector defines a second cooling outlet at the downstream end of the second centerbody surrounding the third fuel injection port.

14. The fuel injector assembly of claim 1, further comprising:
a swirler assembly disposed upstream of the first fuel injection port.

15. A gas turbine engine, the engine comprising: a first fuel injector comprising a first centerbody surrounding a first walled fuel injection circuit, wherein a first fuel injection port is extended at least partially radially through the first centerbody in fluid communication with the first walled fuel injection circuit, and further wherein the first centerbody defines a cooling circuit surrounding the first walled fuel injection circuit, and wherein the first centerbody defines a plurality of cooling openings at a downstream end of the first centerbody, wherein the plurality of cooling openings is in fluid communication with the cooling circuit, and further wherein the first centerbody defines an axially extended cooling outlet at the downstream end of the first centerbody, wherein the first centerbody of the first fuel injector defines a throat area between the cooling circuit and the axially extended cooling outlet, and further wherein the cooling outlet defines an increasing cross sectional area from the throat area to the downstream end of the first centerbody, and wherein the plurality of cooling openings is defined substantially axially through the first centerbody; and
a second fuel injector comprising a second centerbody surrounding a second walled fuel injection circuit, wherein a second fuel injection port is extended at least partially radially through the second centerbody in fluid communication with the second walled fuel injection circuit, and further wherein the second centerbody defines a cooling circuit surrounding the second walled fuel injection circuit, and further wherein the second walled fuel injection circuit defines an axially extended third fuel injection port at a downstream end of the second centerbody.

16. The gas turbine engine of claim 15, wherein the first fuel injector further comprises an internal shroud disposed within the first centerbody, wherein the internal shroud surrounds the first walled fuel injection circuit.

17. The gas turbine engine of claim 15, wherein the first fuel injector and the second fuel injector are arranged asymmetrically around an axial centerline axis of the engine.

* * * * *